UNITED STATES PATENT OFFICE.

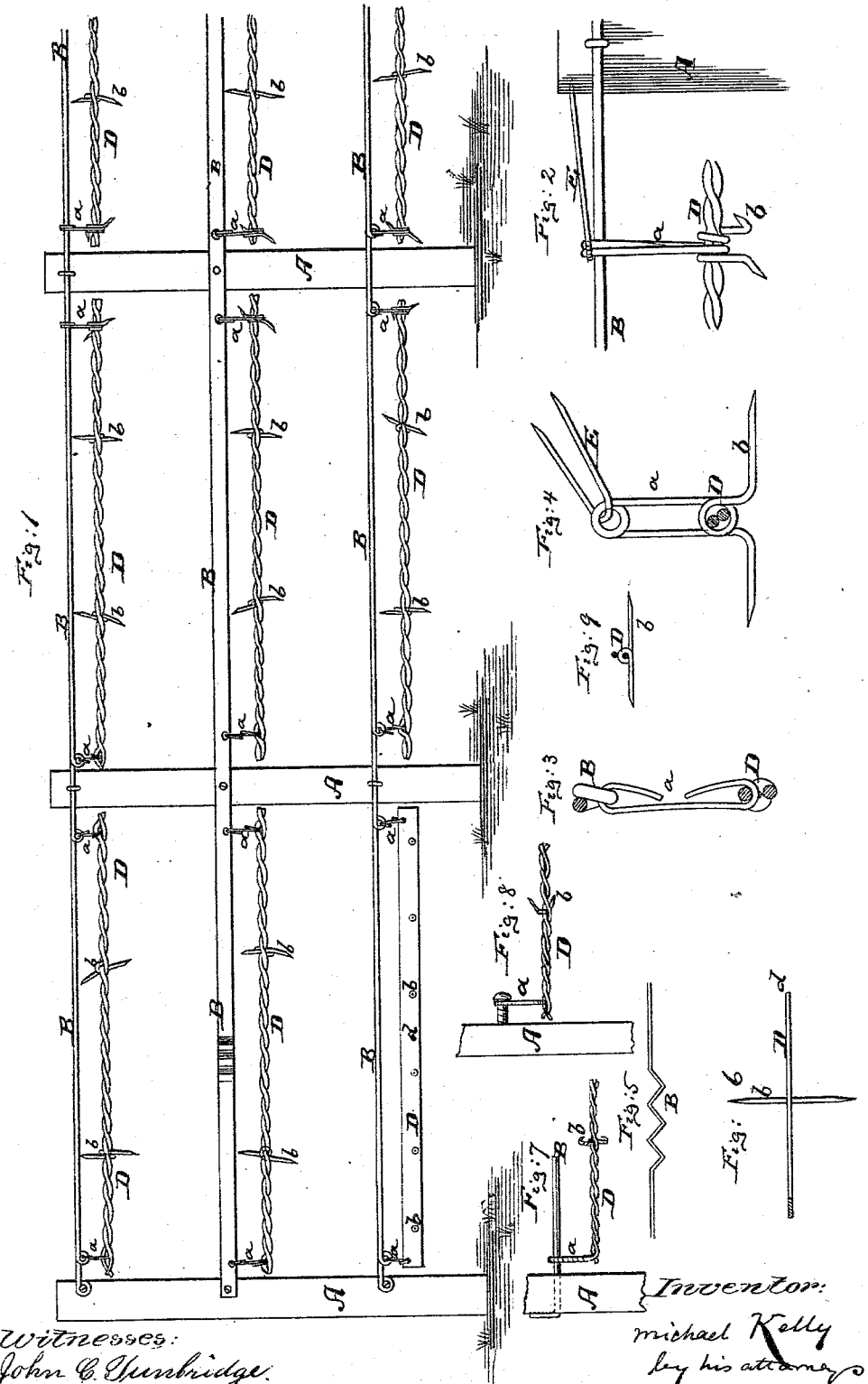

MICHAEL KELLY, OF NEW YORK, ASSIGNOR OF ONE-HALF TO WM. F. LETT, OF BROOKLYN, N. Y.

BARBED-WIRE FENCE.

SPECIFICATION forming part of Letters Patent No. 283,614, dated August 21, 1883.

Application filed March 11, 1882. (No model.)

*To all whom it may concern:*

Be it known that I, MICHAEL KELLY, of New York, in the county and State of New York, have invented a new and useful Improvement in Barbed-Wire Fences, of which the following is a specification.

Figure 1 is a front or face view of a fence having my improved barbed wire. Fig. 2 is an enlarged face view of part of the same; Fig. 3, a cross-section of the same; Fig. 4, a cross-section of a modification thereof; Figs. 5 to 9, inclusive, detail views, hereinafter to be more particularly referred to.

The object of this invention is to produce a wire fence having barbs thereon, which barbs shall answer the purpose of preventing animals from rubbing against or endeavoring to go through or over the fence, but shall not be apt to hurt animals seriously, which is the objection to the barbed-wire fences heretofore made.

The invention consists in suspending the barbed wire in sections, by flexible joints, loosely from the main wires or rails or posts of the fence, so that when an animal comes against the barbs it will be slightly pricked, but not injured thereby.

The invention is intended to protect farmers' quadrupeds from being torn or injured by violent contact with the barbs. A barbed double wire, reaching from post to post—say twenty feet—and suspended according to my invention, is found to weigh about one and a half pounds. This weight causes a resistance which is brought to bear on any of the barbs pressed against, and which is sufficient to prick the thickest skinned farm quadruped, but not sufficient to tear or injure the same. The rigid firmly-fixed wire or strip serves to prevent the animal's being forced farther toward the receding barbed wire or barbed strip. It also serves to suspend the oscillatory barbed wire or strip; but the latter may be suspended also from the posts. Rigid metal strip is used as a substitute for rigid wire and for the same purposes. The oscillatory wire or strip may be placed above or below, or both above and below, the rigid wire or strip; but the length of the links must vary accordingly, so that the oscillatory movement may reach to a proper safety distance; but I prefer placing the oscillatory wire one inch below the rigid wire. Barbed strip is sometimes substituted for barbed wire. The barbs (straight bits of wire or of metal strip, pointed at both ends) are passed through the perforations near the lower edge of the strip and galvanized or soldered.

In the drawings, the letters A A represent the fence-posts, which are shown to be connected by rigidly and firmly fixed wires or strips B B, of wire, sheet metal, wood, or of any other suitable material. From these rigidly-fixed wires or strips are loosely suspended, by means of links *a*, sections D of barbed fence-wire. Each of these sections extends from near the one post to near the next post, and is capable of swinging freely on its links *a*, and each section has pointed barbs *b*, that project in various directions. If an animal comes in contact with the fence, it will be reminded by the barbs of their presence and pricked, but will not be seriously hurt, whereas with the ordinary barbed fences having rigidly-fastened or tightly-tied barbed sections, if an animal should run against it, a barb is apt to pierce the skin and more or less seriously hurt it. Complaints have been made that valuable stock has been injured by the rigidly-stretched barbed fence-wires heretofore used. The barbed sections, being loosely suspended, will right themselves after every contact with animals.

Instead of suspending the barbed section D from the rigidly-fixed wire or strip B, as shown in Fig. 1, the barbed sections may be suspended, through the links *a*, from staples E, that are driven into the posts, and in such a case the rigidly-fixed wires or strips B may or may not be dispensed with.

I do not limit myself to any particular form of barbed section D or the construction thereof. Each barbed section may either be made of twisted wire having wire barbs fastened therein, or sheet-metal barbs may be fastened therein; or, in lieu of the twisted wire, flat strips of sheet metal—such as that shown at *d* in Figs. 1 and 6—may be used, with the barbs *b* passed transversely through their lower parts and locked by galvanizing, soldering, or in other suitable manner.

Fig. 5 shows a top view of one of the sheet-metal rigidly-fixed strips B, that is shown in the middle of Fig. 1.

Instead of joining the sections D by separate links *a* to the wires or strips B, the ends of the sections may be carried up and around such wires or strips B, as in Fig. 7, or around nails or pins fixed in the posts; or the links *a* may be placed around such pins, as in Fig. 8, or in any other manner so as to leave the sections D free to oscillate.

When I speak of an "oscillatory movement" I mean a free movement from side to side of the fence. By creasing the rigid strip, as shown in Fig. 5, I allow for its contraction and expansion in cold and heat. The barbed wire or strip may either be stretched the whole length of the fence and cut into sections afterward, or cut into sections before transportation or erection. The oscillation of the barbed wire may be produced by having a prolongation of some of the barbs serve also as links, as shown in Fig. 2.

The lengths of the sections of oscillating wire or strip should be varied according to the weight of material used therein.

I do not claim a tightly-bound barbed strip such as is shown in Patent No. 138,763, which strip is not self-adjusting, nor an unbarbed indicator-board such as that shown in Patent No. 109,858.

I claim—

1. In combination with the posts A and rigid rails or wires B, independent barbed sections D and interposed connecting-links *a* between the wires or rails D and B, whereby a free vibratory movement of the sections D and links *a* is obtained, as set forth.

2. In combination with the wires B, formed with eyes adjacent to the posts, the independent barbed sections D and connecting-links *a*, secured to the sections and the eyes, as shown and described.

MICHAEL KELLY.

Witnesses:
WILLIAM H. C. SMITH,
WILLY G. E. SCHULTZ.